United States Patent
Uchida et al.

(10) Patent No.: US 10,073,447 B2
(45) Date of Patent: Sep. 11, 2018

(54) ABNORMALITY DIAGNOSIS METHOD AND DEVICE THEREFOR

(71) Applicant: Hitachi, Ltd., Chiyoda-ku, Tokyo (JP)

(72) Inventors: Takayuki Uchida, Tokyo (JP); Hideaki Suzuki, Tokyo (JP); Junsuke Fujiwara, Tokyo (JP); Tomoaki Hiruta, Tokyo (JP); Munetoshi Unuma, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 262 days.

(21) Appl. No.: 14/914,381

(22) PCT Filed: Sep. 13, 2013

(86) PCT No.: PCT/JP2013/074789
§ 371 (c)(1),
(2) Date: Feb. 25, 2016

(87) PCT Pub. No.: WO2015/037113
PCT Pub. Date: Mar. 19, 2015

(65) Prior Publication Data
US 2016/0209838 A1    Jul. 21, 2016

(51) Int. Cl.
*G05B 23/02* (2006.01)
*E02F 9/26* (2006.01)
(Continued)

(52) U.S. Cl.
CPC .......... *G05B 23/0283* (2013.01); *E02F 9/267* (2013.01); *G05B 23/0297* (2013.01);
(Continued)

(58) Field of Classification Search
CPC ................................................ G05B 23/0283
See application file for complete search history.

(56) References Cited

U.S. PATENT DOCUMENTS

2007/0294206 A1* 12/2007 Korman ................ G06F 3/0617
2008/0301504 A1* 12/2008 Chen ...................... G06F 11/008
714/42
(Continued)

FOREIGN PATENT DOCUMENTS

JP    4-34620 A    2/1992
JP    2003-63327 A    3/2003
(Continued)

OTHER PUBLICATIONS

International Search Report (PCT/ISA/210) issued in PCT Application No. PCT/JP2013/074789 dated Oct. 15, 2013, with English translation (two (2) pages).

*Primary Examiner* — Benjamin Sandvik
(74) *Attorney, Agent, or Firm* — Crowell & Moring LLP

(57) ABSTRACT

In industrial machine abnormality diagnosis, if the machine is diagnosed to have abnormality, then sensor data from the machine needs to be sent to a management center for causal analysis. However, since machines operated at a remote site cannot always communicate with a management center, it has been found that, in some cases, sensor data that has failed to be sent from a machine remains in the memory of the machine, resulting in lack of available memory capacity. In view of this, the present invention determines beforehand whether the diagnosed machine will run out of available memory capacity before the completion of sending the amount of sensor data required for causal analysis for the machine, and instructs a maintenance person to recover memory. This determination as to whether the machine will run out of available memory capacity before the completion of sending the amount of sensor data required for the causal analysis for the machine, is made as follows: (1) first, the machine predicts the run-out date on which the machine will run out of memory capacity for storing sensor data generated in the machine, and sends a notification of the predicted (Continued)

run-out date to the management center for the machine; and (2) next, from the amount of sensor data required for the causal analysis and the reception rate of sensor data, the management center calculates the number of days required to retrieve the necessary data for the causal analysis and determines whether the management center can retrieve the data by the predicted run-out date.

6 Claims, 12 Drawing Sheets

(51) Int. Cl.
    *G07C 5/08*     (2006.01)
    *G07C 5/00*     (2006.01)

(52) U.S. Cl.
    CPC ............ *G07C 5/008* (2013.01); *G07C 5/085* (2013.01); *G05B 2219/2616* (2013.01)

(56) References Cited

U.S. PATENT DOCUMENTS

| | | | | |
|---|---|---|---|---|
| 2011/0276842 A1* | 11/2011 | Shibamori | ................ | E02F 9/26 |
| | | | | 714/49 |
| 2014/0330793 A1* | 11/2014 | Chamness | ......... | G06F 17/30153 |
| | | | | 707/692 |
| 2016/0226977 A1* | 8/2016 | Fujiwara | ................ | H04L 67/06 |

FOREIGN PATENT DOCUMENTS

| | | |
|---|---|---|
| JP | 2007-249313 A | 9/2007 |
| JP | 2009-253897 A | 10/2009 |

\* cited by examiner

[FIG. 1]
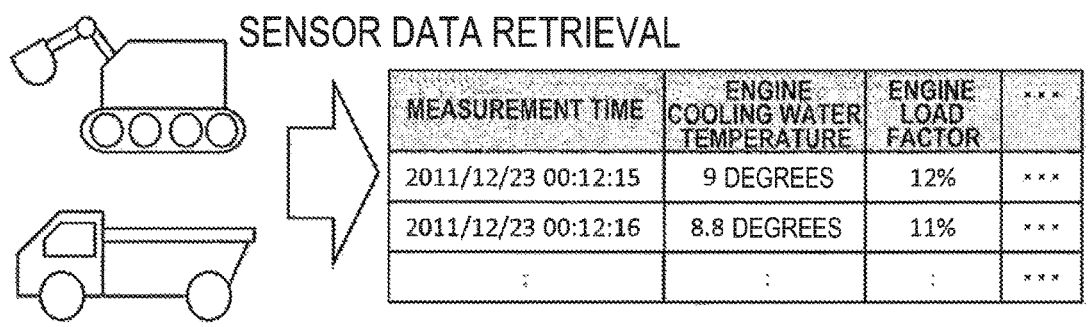

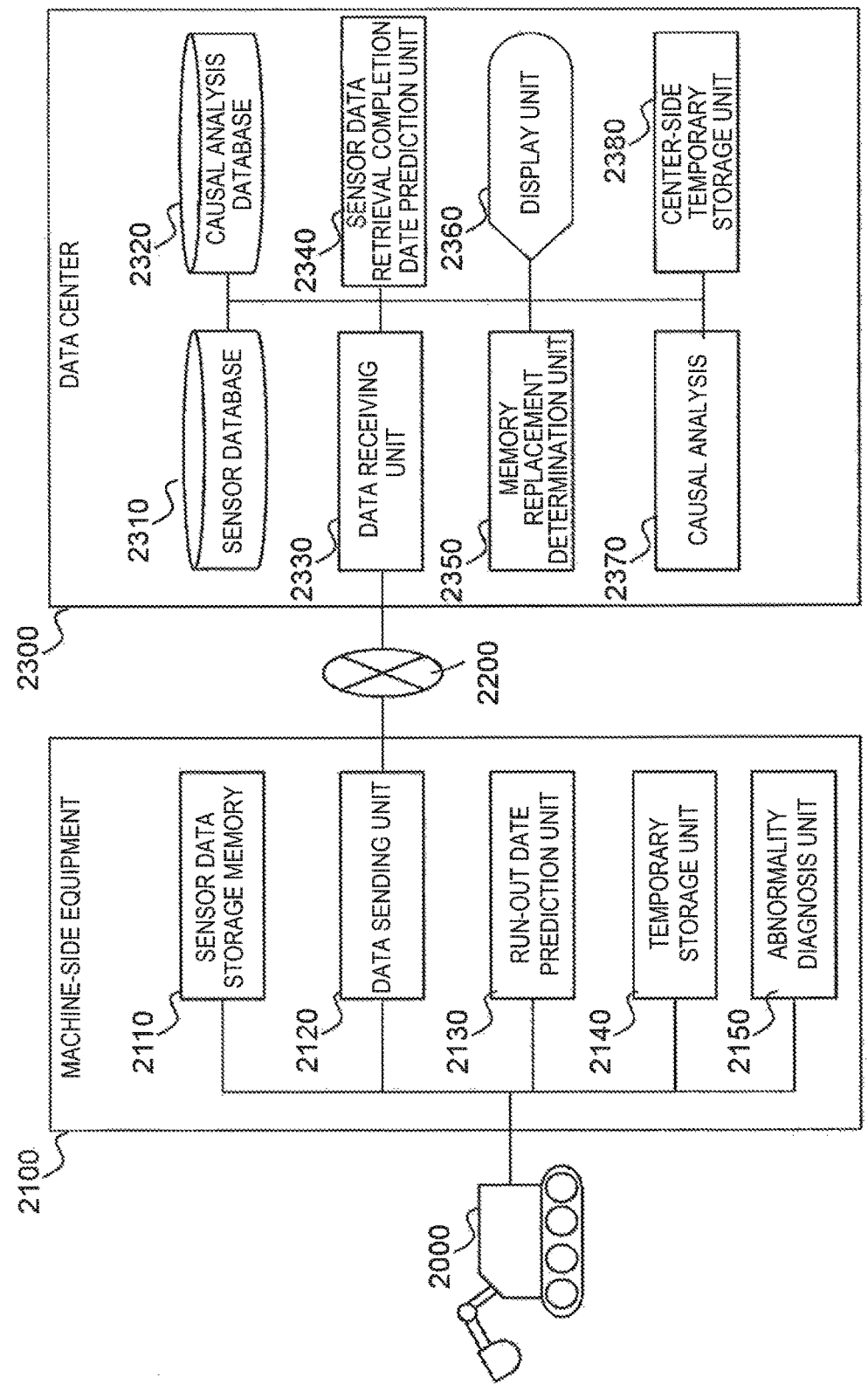
[FIG. 2]

[FIG. 3]

CAUSAL ANALYSIS DATABASE 2320

| ABNORMALITY TYPE 2321 | SENSOR TYPE REQUIRED FOR CAUSAL ANALYSIS 2325 | AMOUNT OF SENSOR DATA REQUIRED FOR CAUSAL ANALYSIS 2327 |
|---|---|---|
| ABNORMAL RISE IN ENGINE PRESSURE | PRESSURE SENSOR | 100MByte |
|  | TEMPERATURE SENSOR | 200Mbyte |
|  | NUMBER OF ENGINE REVOLUTIONS | 50Mbyte |
| ABNORMAL OIL PRESSURE | ‥ | ‥ |
| ‥ | ‥ | ‥ |

FIG. 4I

TEMPORARY STORAGE UNIT 2140

| DATA TYPE | VALUE |
|---|---|
| 2141 ABNORMALITY TYPE | ABNORMAL RISE IN ENGINE PRESSURE |
| 2143 TOTAL AMOUNT OF SENSOR DATA SENT PER DAY | 1000kByte |
| 2145 MEMORY RUN-OUT DATE | 2013/6/24 |
| 2146 REMAINING MEMORY CAPACITY | 20Mbyte |
| 2147 AMOUNT OF INCREASE IN MEMORY CAPACITY | 1.1Mbyte |

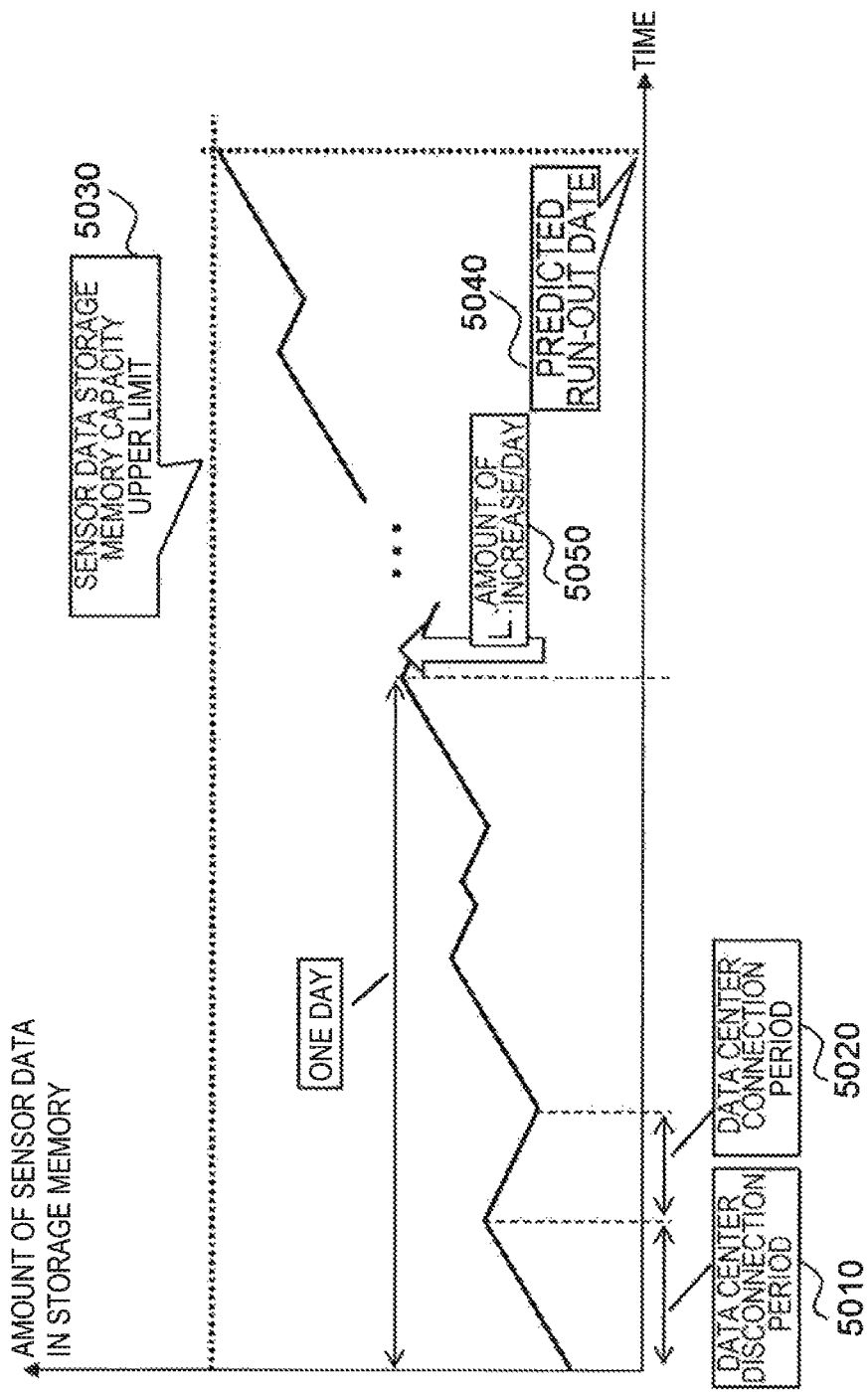

[FIG. 6]
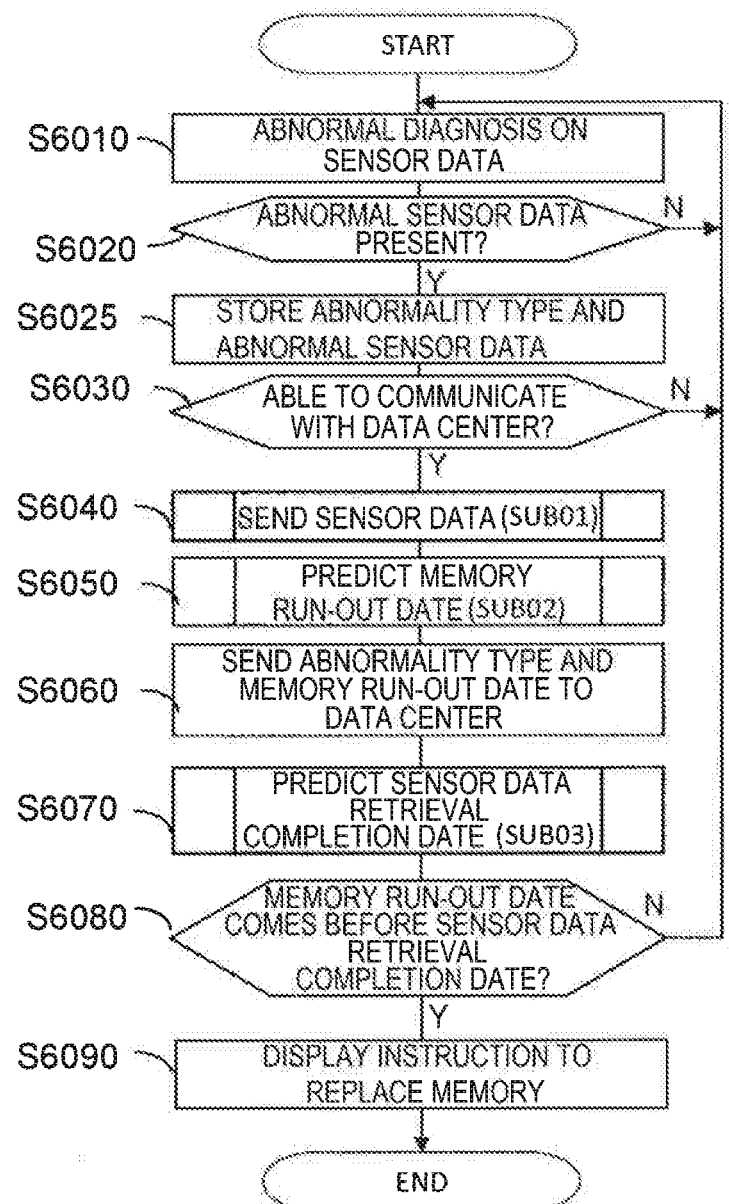

[FIG. 7]
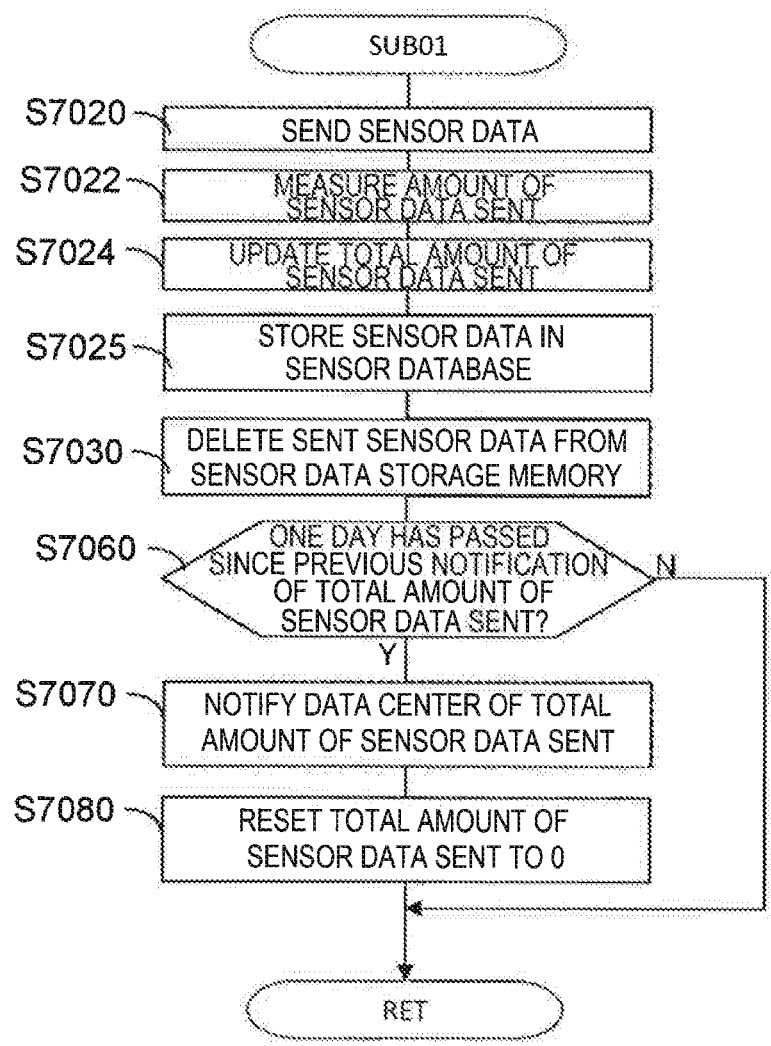

[FIG. 8]
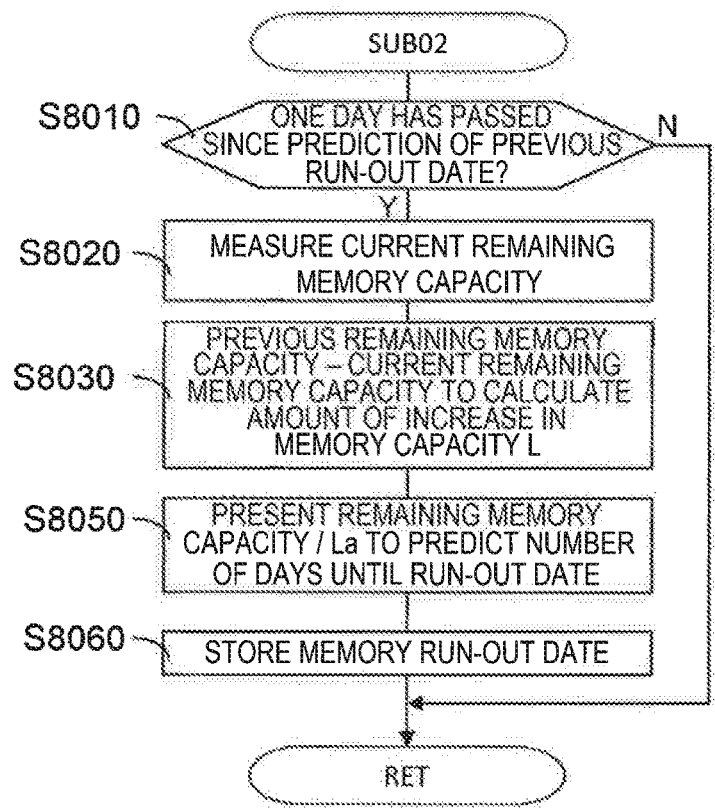
[FIG. 9]
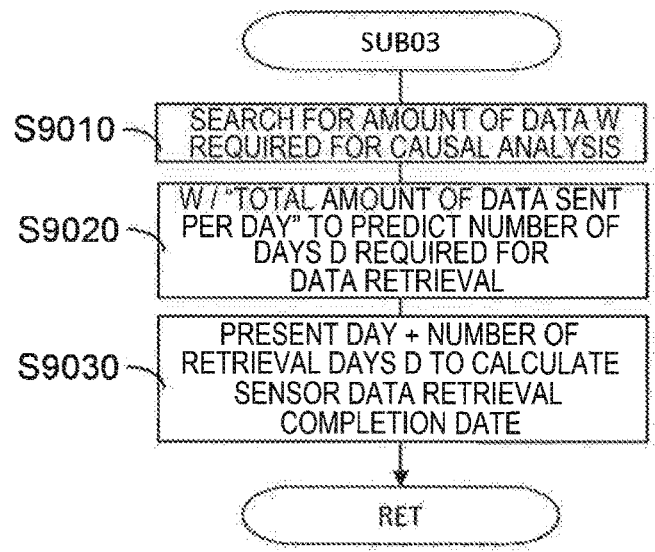

[FIG. 10]

SENSOR DATA STORAGE MEMORY OF MACHINE ID:0001
IS RUNNING OUT OF REMAINING CAPACITY
<PREDICTED MEMORY RUN-OUT DATE: 2013/6/24>

TO CARRY OUT CAUSAL ANALYSIS OF ABNORMALITY,
PLEASE REPLACE MEMORY OF MACHINE BY
ABOVE PREDICTED DATE

SENSOR DATA STORAGE MEMORY

| MEASUREMENT TIME | ENGINE COOLING WATER TEMPERATURE | ENGINE LOAD FACTOR | ... |
|---|---|---|---|
| 2011/12/23 00:12:15 | 9 DEGREES | 12% | ××× |
| 2011/12/23 00:12:16 | 8.8 DEGREES | 11% | ××× |
| ⋮ | ⋮ | ⋮ | ××× |

[FIG. 12]

SENSOR DATABASE 2310

| MACHINE ID 2311 | MEASUREMENT TIME 2312 | ENGINE COOLING WATER TEMPERATURE 2313 | ENGINE LOAD FACTOR 2315 | ... |
|---|---|---|---|---|
| 0001 | 2011/12/23 00:12:15 | 9 DEGREES | 12% | ... |
|  | 2011/12/23 00:12:16 | 8.8 DEGREES | 11% | ... |
|  | : | : | : | ... |
| 0002 | 2011/12/23 00:12:15 | 23 DEGREES | 69% | ... |
|  | 2011/12/23 00:12:16 | 18 DEGREES | 67% | ... |
|  | : | : | : | ... |

[FIG. 13]

| CENTER-SIDE TEMPORARY STORAGE UNIT 2380 ||
|---|---|
| DATA TYPE | VALUE |
| 2381 ABNORMALITY TYPE | ABNORMAL RISE IN ENGINE PRESSURE |
| 2383 TOTAL AMOUNT OF SENSOR DATA SENT PER DAY | 1000kByte |
| 2385 MEMORY RUN-OUT DATE | 2013/6/24 |

[FIG. 14]
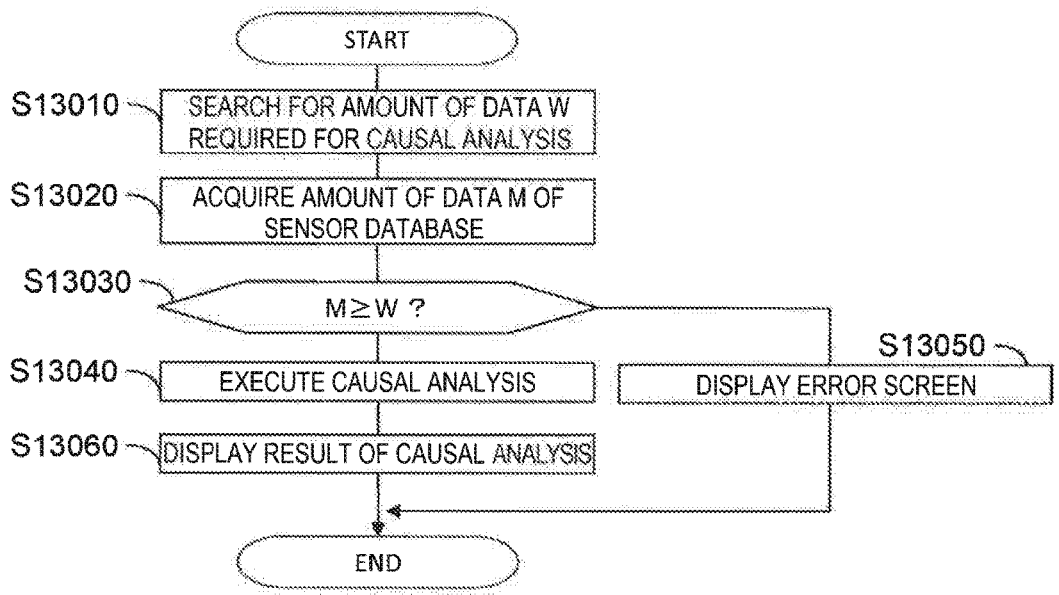
[FIG. 15]
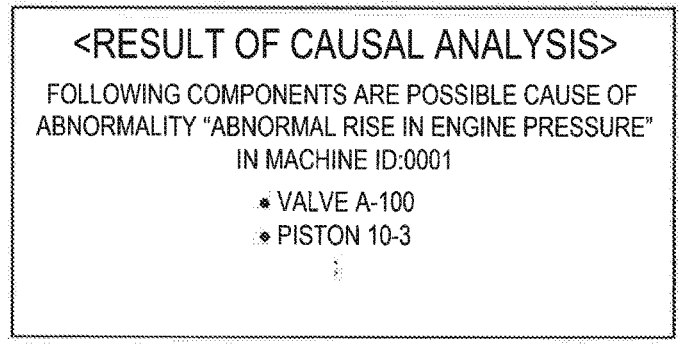
[FIG. 16]
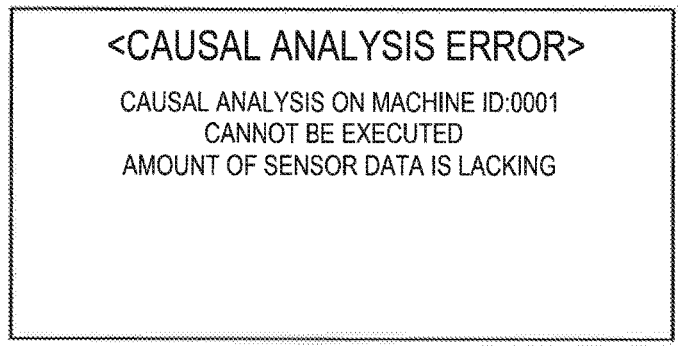

ABNORMALITY DIAGNOSIS METHOD AND DEVICE THEREFOR

TECHNICAL FIELD

The present invention relates to an abnormality diagnosis method in which information about a machine is gathered from sensors attached to each part of the machine and then abnormality diagnosis is carried out, in order to detect an abnormality in the machine and carry out causal analysis thereof, and a device therefor.

BACKGROUND ART

In order to allow a machine such as a gas engine, elevator, or mining/construction machine to operate constantly, maintenance work on the machine is essential. One of effective techniques for maintenance work is the technique of gathering sensor data from sensors attached to each part of the machine, then carrying out abnormality diagnosis of the machine on the basis of the gathered sensor data, and carrying out causal analysis of an abnormality if it is found.

To carry out this technique, abnormality diagnosis of the sensor data of the machine is carried out, and if an abnormality is found, the sensor data is gathered at a data center via communication or the like, so as to carry out causal analysis. FIG. 1 is an example in which engine cooling water temperature and engine load factor combined with measurement time are gathered from machines. In the case of a machine operating at a site where communication often breaks down or where the communication speed drops, data is temporarily stored in a storage device installed in the machine, and the unsent sensor data is collectively sent when the communication state with the data center is good. If the already sent sensor data is erased from the storage device of the machine, the available capacity of the storage device can be saved as well.

However, if the drop in the communication speed continues for a long time, the amount of data that can be sent to the data center decreases. Therefore, the sensor data cannot erased from the storage device installed in the machine, posing the problem of running out of the available capacity.

As a data gathering method to solve such a problem, for example, PTL 1 discloses the invention of sending a warning to the data center if the remaining available capacity of the storage device installed in the machine has fallen to or below a threshold.

CITATION LIST

Patent Literature

PTL 1: JP-A-4-34620

SUMMARY OF INVENTION

Technical Problem

According to the technique of PTL 1, while it can be learned that the remaining available capacity of the storage device of the machine has fallen to or below the threshold, no instruction is given on what should be done as a consequence.

An object of the invention is to provide an abnormality diagnosis method in which it is determined whether an amount of sensor data required for causal analysis of a machine found to have an abnormality can be gathered or not and in which an instruction is given on whether to replace the storage device of the machine or not, and a device therefor.

Solution to Problem

In order to solve the foregoing problem, an abnormality diagnosis device according to the invention includes: an abnormality diagnosis unit which carries out abnormality diagnosis on the basis of sensor data measured by sensors attached to each part of a machine; a storage unit which, if an abnormality is found, stores the sensor data thereof; an abnormality diagnosis data gathering unit which sends abnormality diagnosis data to a data center using communication; and a unit which predicts an available capacity run-out date on which a storage device of the machine runs out of remaining available capacity when the communication state is not good and not all unsent sensor data can be sent to the data center.

The abnormality diagnosis device according to the invention may further include a unit which predicts a data retrieval completion date on which retrieval of an amount of sensor data required for causal analysis is completed, on the basis of the amount of data successfully sent to the data center.

Moreover, in the abnormality diagnosis device according to the invention, prediction results of the available capacity run-out date of the storage device and the data retrieval completion date may be compared with each other, and it may be determined whether or not the storage device runs out of the available capacity before the retrieval of data required for causal analysis is completed.

Also, in order to solve the foregoing problem, an abnormality diagnosis method according to the invention includes: carrying out abnormality diagnosis on the basis of sensor data measured by sensors attached to each part of a machine; if an abnormality is found, storing the sensor data thereof; sending abnormality diagnosis data to a data center using communication; and predicting a run-out date on which a storage device of the machine runs out of remaining available capacity when the communication state is not good and not all unsent sensor data can be sent to the data center.

The abnormality diagnosis method according to the invention may further includes predicting a data retrieval completion date on which retrieval of an amount of sensor data required for causal analysis is completed, on the basis of the amount of data successfully sent to the data center.

Moreover, in the abnormality diagnosis method according to the invention, prediction results of the available capacity run-out date of the storage device and the data retrieval completion date may be compared with each other, and it may be determined whether or not the machine runs out of the available capacity before the retrieval of data required for causal analysis is completed.

Advantageous Effect of Invention

With the abnormality diagnosis method and device therefor according to the invention, whether or not an amount of sensor data required for causal analysis can be retrieved before the remaining capacity of the storage device storing the sensor data of the machine is predicted, and if the sensor data cannot be retrieved, an instruction to replace the storage device is sent outside. Thus, an abnormality of the machine can be detected and causal analysis thereof can be securely executed.

BRIEF DESCRIPTION OF DRAWINGS

FIG. 1 is a view explaining the gathering of sensor data from machines.

FIG. 2 is an overall configuration view of a system according to an example.

FIG. 3 is an internal data configuration view of a database in the system according to the example.

FIG. 4 is an internal data configuration view of a database in the system according to the example.

FIG. 5 is a view explaining the principles of the invention.

FIG. 6 is a flowchart according to the example.

FIG. 7 is a flowchart according to the example.

FIG. 8 is a flowchart according to the example.

FIG. 9 is a flowchart according to the example.

FIG. 10 is an exemplary screen displayed in the example.

FIG. 11 is an internal data configuration view of a database in the system according to the example.

FIG. 12 is an internal data configuration view of a database in the system according to the example.

FIG. 13 is an internal data configuration view of a database in the system according to the example.

FIG. 14 is a flowchart according to the example.

FIG. 15 is an exemplary screen displayed in the example.

FIG. 16 is an exemplary screen displayed in the example.

DESCRIPTION OF EMBODIMENTS

Hereinafter, an example of the invention will be described using the drawings.

Example

FIG. 2 shows the overall configuration using a computer system according to the invention. FIG. 3 and FIG. 4 are views explaining the table structures in a database and on a temporary storage unit. FIG. 5 is a view explaining a method for predicting the day on which a storage memory for sensor data runs out of available capacity. FIG. 6, FIG. 7, FIG. 8 and FIG. 9 show processing flows. FIG. 10 shows a screen which instructs the user of a data center to replace the sensor data storage memory of the machine. FIG. 11 shows the table structure of sensor data stored in the sensor data storage memory.

In the overall configuration of FIG. 2 showing an example of the invention, a machine 2000 is a machine to be a maintenance target. For example, in the case of a construction machine, a truck or loader, or in the case of an industrial machine, an elevator or the like is equivalent to this.

Machine-side equipment 2100 is equipment installed on the machine or installed near the site where the machine operates, and can constantly communicate data with the machine at high speeds. The machine-side equipment 2100 includes at least the configuration described below.

A sensor data storage memory 2110 is a memory which stores sensor data of the machine 2000 diagnosed to have an abnormality. Its internal table structure includes a set of respective sensor values such as sensor measurement time 2111, engine cooling water temperature 2113, and engine load factor 2115, as shown in FIG. 11. It is desirable that this memory is a memory of a type that can be easily replaced when the memory is full, such as a compact flash or USB memory.

A data sending unit 2120 sends sensor data stored in 2110 and information of an abnormality type which is an abnormality diagnosis result stored in 2140, to a data center 2300.

A run-out date prediction unit 2130 predicts the day on which the sensor data storage memory 2110 runs out of the remaining capacity.

A prediction method will be described, using the graph of FIG. 5 according to the example. The horizontal axis represents time, and the vertical axis represents the amount of unsent sensor data that is accumulated in the sensor data storage memory 2110 and has not been sent to the data center yet. What should be predicted is a predicted run-out date 5040 on which, the amount of unsent sensor data exceeds a sensor data storage memory capacity upper limit 5030. In order to carry out prediction, it is assumed in FIG. 5 that a period 5010 during which communication with the data center is disconnected and a data center connection period 5020 during which communication is successfully connected take place alternately in one day. In the communication disconnection period 5010, sensor data measured every moment is stored in the sensor data storage memory 2110 but the sensor data cannot be sent to the data center. Since the unsent sensor data should not be deleted from 2110, the amount of sensor data stored in the sensor data storage memory 2110 increases. In the subsequent data center connection period 5020, sensor data is sent to the data center and the sent sensor data is deleted from the sensor data storage memory 2110. Therefore, during the data center connection period 5020 in the communication, the amount of sensor data in the storage memory decreases. However, if the duration of 5020 during which the communication is successfully connected is short, or if the communication speed is low, an amount of increase 5050 of sensor data in the storage memory per day increases. This amount of increase per day L is found by measuring the remaining capacity of the sensor data storage memory 2110 per day and calculating how much the remaining capacity has decreased since yesterday. Since the number of days before the memory runs out of its capacity can be calculated by dividing the sensor data storage memory capacity upper limit 5030 by the amount of increase L, the predicted run-out date 5040 is thus found. However, since the value of the amount of increase per day L is considered to vary slightly day by day, an average value La of L may be used instead of L. To calculate the average value La, for example, an average value or a moving average per week can be used.

A temporary storage unit 2140 is made up of a RAM memory or the like and temporarily stored abnormality type 2141, total amount of sensor data sent per day 2143, memory run-out date information 2145 predicted by the run-out date prediction unit 2130, remaining memory capacity 2146 of the sensor data storage memory 2110, and amount of increase in memory capacity per day 2147 shown in FIG. 4 are temporarily stored.

An abnormality diagnosis unit 2150 carries out abnormality diagnosis using a data mining technique on the basis of the sensor data measured every moment by the sensors in each part of the machine 2000. Whether the value of sensor data falls within an abnormal range is determined with the data mining technique, thus carrying out abnormality diagnosis of the machine. As the abnormal range varies depending on the type of abnormality, the type of abnormality can be discriminated on the basis of which abnormal range the value falls in. Also, the sensor data diagnosed to have one of such abnormalities is stored in the sensor data storage memory 2110.

A communication channel 2200 is communication equipment for sending data from the machine-side equipment to the data center side and is made up of equipment such as an internet channel or telephone line. The invention is to solve the problem due to the drop in the communication speed in 2200.

The data center 2300 determines whether the sensor data storage memory on the machine side runs out of the remaining capacity before retrieval of sensor data required for causal analysis, and instructs the user to replace the memory if the memory runs out of the remaining capacity.

The data center 2300 is made up of sections 2310 to 2370 described below. The sensor database 2310 is a database in which abnormal sensor data sent from the machine is stored. As the internal table structure of the sensor database 2310, the values of respective sensors such as measurement time 2312, engine cooling water temperature 2313, and engine load factor 2315 are stored corresponding to each machine with machine ID 2311, as shown in FIG. 12. Using the machine ID as a search key, sensor data required for carrying out causal analysis can be acquired.

The causal analysis database 2320 is a database in which an amount of data required for analyzing the cause of the abnormality from the sensor data determined as abnormal is stored.

FIG. 3 shows the table structure of the causal analysis database 2320.

Data is stored in such a way that the sensor type required for causal analysis 2325 and the amount of data required for causal analysis 2327 can be searched for, using the abnormality type 2321, which is the result of abnormality diagnosis, as a search key.

The data receiving unit 2330 receives the type of the abnormality and the abnormal sensor data generated in the machine from the machine-side data sending unit 2120, and the predicted run-out date of the memory predicted by the run-out date prediction unit 2130.

The sensor data retrieval completion date prediction unit 2340 receives the type of the abnormality and the amount of abnormal sensor data from the data receiving unit 2330, predicts the time taken for retrieval of an amount of sensor data required for causal analysis, and calculates a sensor data retrieval completion date.

The memory replacement determination unit 2350 determines whether the sensor data retrieval completion date predicted by the sensor data retrieval completion date prediction unit 2340 comes by the memory run-out date predicted by the run-out date prediction unit 2130. If the retrieval completion date does not come by the memory run-out date, an instruction to replace the memory of the machine is displayed on the display unit 2360.

The display unit 2360 is a presentation device made up of a liquid crystal display or the like and presents the instruction to replace the memory of the machine and the analysis result of the causal analysis 2370, to the user of the data sensor.

The causal analysis 2370, in response to the user instruction at the data center 2300, reads out sensor data from the sensor database 2310 and carries out causal analysis of the abnormality of the machine. In the causal analysis, a component or operation of the machine 2000 that causes the abnormality is determined on the basis of the relations between machine components and operations, and the type and value of the sensor showing the abnormality, using a method such as a binary tree based on the data mining technique. In order to perform highly accurate determination, a predetermined amount of data or greater is required. Therefore, if the required amount of sensor data defined in the causal analysis database 2320 is not found in the sensor database, causal analysis is not carried out.

A center-side temporary storage unit 2380 is a storage device made up of a RAM memory or the like installed on the center side. As shown in FIG. 13, this storage device stores abnormality type 2381, total amount of sensor data sent per day 2383, and memory run-out date 2385.

Next, flowcharts of processing procedures for notifying the replacement of the sensor data storage memory for the abnormality diagnosis and causal analysis of abnormality carried out in the system according to the invention shown in FIG. 2 will be described, using the flowcharts of FIG. 6 to FIG. 9.

In Step 6010 (hereinafter referred to as S6010) of FIG. 6, abnormality diagnosis is carried out on the basis of sensor data measured by the sensors at each part of the machine 2000. The abnormality diagnosis of the machine is carried out by determining whether the value of the sensor data falls within an abnormal range, with the data mining technique. As the abnormal range varies depending on the type of the abnormality, the type of the abnormality can be discriminated on the basis of which abnormal range the value of the sensor data falls in. As the presence/absence and type of an abnormality are discriminated, the processing goes to S6020.

In S6020, if the machine is diagnosed to have an abnormality in S6010, the processing goes to S6025. If not, the processing returns to S6010 to continue abnormality diagnosis.

In S6025, the type of the abnormality, which is the diagnosis result in S6010, is stored as the abnormality type 2141 of FIG. 4 in the temporary storage unit 2140. Also, the sensor data diagnosed as abnormal is stored in the sensor data storage memory 2110, combined with the measurement time, as in the table structure of FIG. 11.

In S6030, the data sending unit 2120 confirms whether data can be sent to the data center 2300 via communication. If data can be sent, the processing goes to S6040. If not, the processing returns to S6010 to continue abnormality diagnosis.

S6040 is a subroutine SUB01 in which the sensor data and the total amount of sensor data sent per day are sent to the data center 2300. The subroutine SUB01 will be described with reference to FIG. 7.

In S7020 of FIG. 7, the sensor data diagnosed as abnormal in S6010 is sent to the data center 2300.

In S7022, the amount of sensor data sent is measured.

In S7024, the total value per day, of the amounts of sensor data sent, is updated. To find the total value of the amounts of sensor data sent, the amount of sensor data sent, measured in S7022, is added to the value of the total amount of sensor data sent per day 2143 (FIG. 4) stored in the temporary storage unit 2140.

For example, if the value of the total amount of sensor data sent per day 2143 of FIG. 4 is 1000 Kbytes and the amount of sensor data measured in S7022 is 10 Kbytes, the total value is 1010 Kbytes. The total amount of sensor data sent per day 2143 of FIG. 4 is overwritten with this total value. Since the total amount of sensor data sent per day 2143 is reset to 0 every day, the total value of the amounts of sensor data sent today is provided at the end of the day.

In S7025, in the data center 2300, the data receiving unit 2330 receives the sensor data and stores the sensor data in the sensor database 2310. In S7030, the sent sensor data is deleted from the sensor data storage memory 2110.

In S7060, whether one day has passed since the previous notification is determined, in order to notify the data center of the total amount of sensor data sent today. The determination on whether one day has passed is carried out using the internal clock of the machine 2000. If one day has passed, the processing shifts to S7070. If not this subroutine SUB01 ends and the processing shifts to S6050 of FIG. 6.

In S7070, a notification of the total amount of sensor data sent today is risen to the data center, using the data sending unit 2120. The total amount of sensor data sent today is read out from 2143 of FIG. 4 overwritten in S7024.

In S7080, the total amount of sensor data sent today is sent to the data center. The value of the total amount of sensor data sent, thus sent, is stored as the total amount of sensor data sent per day 2383 of FIG. 13 in the center-side temporary storage unit 2380. After it is sent, the value of the total amount of sensor data sent per day 2143 in the temporary storage unit 2140 is reset to 0. As the value is reset to 0, the total amount of sensor data sent per day for the following day becomes ready to be calculated. After S7080 ends, the processing shifts to S6050 of FIG. 6.

S6050 is a subroutine SUB02 in which a run-out date of the sensor data storage memory 2110 is predicted every day. This subroutine will be described, using FIG. 8.

In S8010 of FIG. 8, in order to predict, a run-out date every day, whether one day has passed since the prediction of the previous run-out date is confirmed. This confirmation is carried out using the internal clock of the machine 2000. If one day has not passed, this subroutine ends and the processing goes to S6060. If one day has passed, the processing goes to S8020.

In S8020, the current remaining capacity of the sensor data storage memory 2110 is measured.

In S8030, the difference between the latest remaining memory capacity and the previous remaining memory capacity measured on the previous day is calculated and the amount of increase in memory capacity L is calculated. The remaining memory capacity measured on the previous day is read out from the remaining memory capacity 2146 (FIG. 4) of the temporary storage unit 2140, and the amount of increase in memory capacity L, which is its difference from the latest remaining capacity, is calculated. After the calculation, the amount of increase in memory capacity 2147 is overwritten with the calculation result L, and the remaining memory capacity 2146 is also overwritten with the latest remaining memory capacity.

In S8050, the latest remaining memory capacity is divided by the amount of increase in memory capacity L and the result is predicted to be the number of days until the memory run-out date.

In S8060, the present day is added to the number of days until the memory run-out date, thus finding the memory run-out date. The information of this date is stored in the memory run-out date 2145 (FIG. 4) of the temporary storage unit 2140. After S8060 ends, this subroutine SUB02 is completed and the processing goes to S6060.

In S6060, the abnormality type stored in the temporary storage unit 2140 in S6025 and the memory run-out date predicted in S6050 are sent to the data center. The abnormality type is read out and sent from 2141, and the memory run-out date is read out and sent from 2145. The abnormality type and the memory run-out date received by the data receiving unit 2330 are stored as the total amount of sensor data sent per day 2383 and the memory run-out date 2385 of FIG. 13 in the center-side temporary storage unit 2380.

S6070 is a subroutine SUB03 in which a sensor data retrieval completion date is predicted from the abnormality type thus sent.

The processing of the subroutine SUB03 will be described, using FIG. 9.

In S9010, the abnormality type is read out from the total amount of sensor data sent per day 2383 (FIG. 13) in the center-side temporary storage unit 2380. Using the abnormality type as a search key, the abnormality type 2321 (FIG. 3) in the causal analysis database 2320 is searched for. The sensor type 2325 and the amount of sensor data 2327 required for causal analysis are acquired as the results of the search.

In S9020, the number of days taken for retrieving the amount of sensor data required for causal analysis 2327 is calculated. The total value of the acquired amounts of sensor data 2327 corresponding to all the sensors is divided by the "total amount of data sent per day", thus finding the number of days required for data retrieval. The "total a amount of data sent per day" is stored in the center-side temporary storage unit 2380 in S6040. The "total amount of data sent per day" is read out from the total amount of sensor data sent per day 2383 of FIG. 13 in the center-side temporary storage unit 2380, and the number of retrieval days D for retrieving the amount of data 2327 of each sensor is calculated.

In S9030, the number of retrieval days D is added to the present day, thus calculating the sensor data retrieval completion date. After the calculation, this subroutine SUB03 ends and the sensor data retrieval completion date is returned to S6080.

In S6080, the received sensor data retrieval date and the memory run-out date are compared, thus determining whether the memory runs out of the capacity by the sensor data retrieval date. The memory run-out date can be read out from the memory run-out date 2385 of FIG. 13 stored in the center-side temporary storage unit 2380.

If the memory run-out date comes before the sensor date retrieval completion date as a result of the comparison of the dates, the processing goes to S6090. If not, the processing returns to the initial S6010 to continue abnormal diagnosis.

In S6090, since the sensor data storage memory runs out of the remaining capacity before the retrieval of sensor data required for causal analysis, an instruction to replace the sensor data storage memory 2110 is displayed on the display unit 2360 to the user of the data center 2300. After S6090, this flowchart is completed.

Next, a processing flowchart in which the user carries out causal analysis at the data center will be described, using FIG. 14. FIG. 15 and FIG. 16 explain screens displayed during the flowchart of FIG. 14. This processing low is a processing flow executed when the user requests causal analysis at an arbitrary timing. If the amount of sensor data required for causal analysis has successfully been retrieved, causal analysis is executed. If not, an error screen is displayed.

In S13010 of FIG. 14, the causal analysis database is searched through, using the type of the abnormality occurring in the machine 2000 as a search key, and the sensor type 2325 and the amount of data 2327 are acquired in an amount required for causal analysis. The type of the abnormality used as a search key is read out from the abnormality type 2381 of FIG. 13 in the center-side temporary storage unit 2380.

In S13020, the sensor database 2310 is searched through, and the amount of sensor data M of the sensor required for causal analysis, in 2310, is acquired.

In S13030, the value (denoted by W) of the amount of sensor data required for causal analysis 2327 found in S13010 and the amount of sensor data M acquired in S13020 are compared. If the sensor data required for causal analysis is already provided, that is, M≥W, the processing goes to S13040. If not, the processing goes to the display of an error screen in S13050.

In S13050, since the amount of sensor data is insufficient for causal analysis, a message to that effect is displayed on the display unit 2360, as shown in FIG. 16. After that, this flowchart ends.

In S13040, since the amount of sensor data required for causal analysis is provided, causal analysis is carried out. The sensor data is read out from the sensor database 2310 and causal analysis of the abnormality in the machine is carried out. In the causal analysis, a component or operation of the machine 2000 that causes the abnormality is determined on the basis of the relations between machine components and operations, and the type and value of the sensor with abnormality, using a method such as a binary tree based on the data mining technique.

In S13060, as the results of the causal analysis, the name of the abnormality occurring in the machine and the names of components to be candidates of the cause are displayed on the operation display unit 2360, as shown in FIG. 15. After the results are displayed, this flowchart ends.

The invention claimed is:

1. An abnormality diagnosis device arranged with a machine, which is a construction machine or an industrial machine, to diagnose abnormalities in the machine, the abnormality diagnosis device comprising:
    a first processor programmed to perform an abnormality diagnosis based on sensor data measured by sensors attached the machine using data mining, and produce abnormality diagnosis data;
    a memory which, if an abnormality is found by the first processor during the abnormality diagnosis, receives and stores the sensor data corresponding to the abnormality;
    a transmitter configured to transmit the abnormality diagnosis data and the sensor data to a data center through a communication channel arranged between the abnormality diagnosis device and the data center; and
    a second processor programmed to predict an available capacity run-out date on which the memory will run out of remaining available capacity when a communication speed between the machine and the data center has dropped and not all unsent sensor data can be sent to the data center.

2. The abnormality diagnosis device according to claim 1, further comprising
    a third processor programmed to predict a data retrieval completion date on which retrieval of an amount of sensor data required for causal analysis is completed, based on the amount of data successfully sent to the data center.

3. The abnormality diagnosis device according to claim 2, wherein
    prediction results of the available capacity run-out date of the memory and the data retrieval completion date are compared with each other, and a determination is made whether or not the memory will run out of the available capacity before the retrieval of the sensor data required for the causal analysis is completed.

4. An abnormality diagnosis method comprising:
    receiving, in an abnormality diagnosis device, sensor data from sensors attached to a machine, which is a construction machine or an industrial machine;
    carrying out an abnormality diagnosis based on the sensor data using data mining to produce abnormality diagnosis data;
    if an abnormality is found during the abnormality diagnosis, receiving and storing the sensor data corresponding to the abnormality in a memory;
    sending the abnormality diagnosis data and the sensor data to a data center through a communication channel arranged between the abnormality diagnosis device and the data center; and
    predicting a run-out date on which a memory of the machine runs out of remaining available capacity when a communication speed between the machine and the data center has dropped and not all unsent sensor data can be sent to the data center.

5. The abnormality diagnosis method according to claim 4, further comprising
    predicting a data retrieval completion date on which retrieval of an amount of sensor data required for causal analysis is completed, based an amount of data successfully sent to the data center.

6. The abnormality diagnosis method according to claim 5, wherein
    prediction results of the available capacity run-out date of the memory and the data retrieval completion date are compared with each other, and a determination is made whether or not the memory will run out of the available capacity before the retrieval of the sensor data required for the causal analysis is completed.

* * * * *